(No Model.)

F. C. WESTON.
CYCLOMETER.

No. 481,608. Patented Aug. 30, 1892.

WITNESSES.
J. M. Dolan
W. H. Whitney

INVENTOR.
Frank C. Weston
by his attys
Clarke & Raymond

UNITED STATES PATENT OFFICE.

FRANK C. WESTON, OF BANGOR, MAINE.

CYCLOMETER.

SPECIFICATION forming part of Letters Patent No. 481,608, dated August 30, 1892.

Application filed April 15, 1891. Serial No. 388,993. (No model.)

*To all whom it may concern:*

Be it known that I, FRANK C. WESTON, a citizen of the United States, residing at Bangor, in the county of Penobscot and State of Maine, have invented a new and useful Improvement in Cyclometers, of which the following is a full, clear, and exact description, reference being had to the following drawings, forming a part of this specification, in explaining its nature.

The invention relates, primarily, to a cyclometer adapted to be fastened to the frame of a bicycle or tricycle, and preferably with its dial upward or in a position to be read by the rider when in his saddle, and which is actuated by one of the wheels of the machine or by some moving part thereof.

It further consists in various features of construction, organization, and application, reference to which will hereinafter be made.

Figure 1:
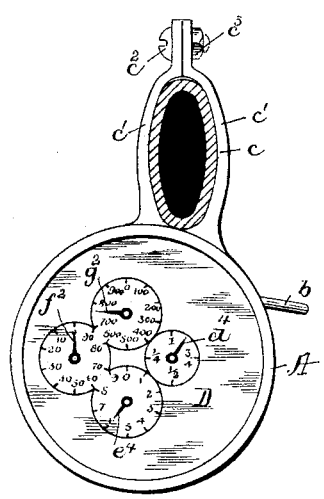
Figure 2:
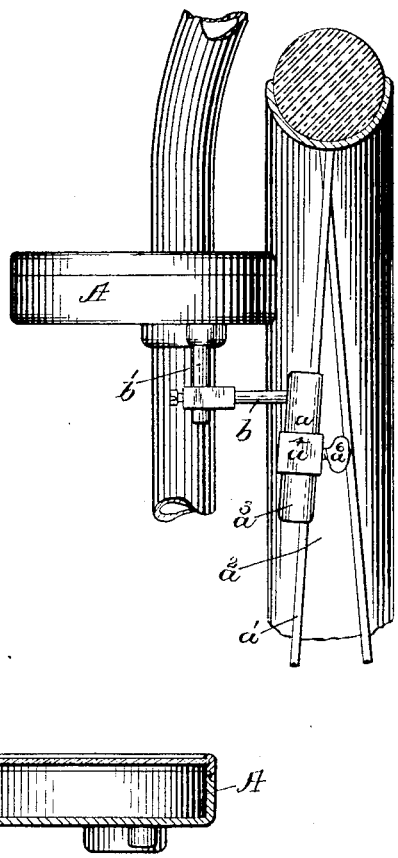
Figures 3, 4:
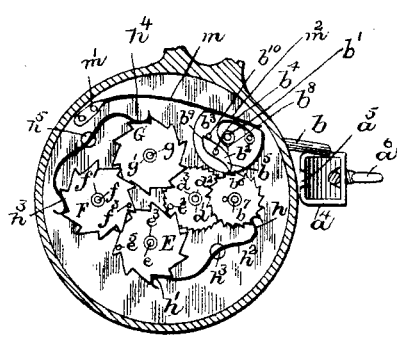

In the drawings, Figure 1 is a view in plan of the cyclometer attached to one fork of a bicycle. Fig. 2 is a detail view in elevation to represent the relation between the cyclometer, fork, and wheel. Fig. 3 is a plan view of the cyclometer, the dial being removed. Fig. 4 is a vertical section through the case, the works being removed.

The cyclometer is represented in the drawings as applied to a bicycle, and it is shown as attached to the front fork of the machine. The cyclometer is represented as consisting of a case A, preferably of metal, and a train of gears contained in the case and actuated by a tappet or projection $a$ upon the spoke $a'$ of the wheel $a^2$, acting through the oscillating arm or lever $b$ at the lower end of the shaft $b'$. The case A has upon one side a clamp $c$ of any desired form, by means of which it is attached to the fork or other part of the bicycle. The clamp shown in the drawings has the two sections $c'$, one or both of which may be yielding and the ends of which are adapted to be brought together and held by a screw $c^2$, passing through holes in the outer ends of the sections and the nut $c^3$. The oscillating arm or lever $b$ communicates motion to the registering devices through the shaft $b'$ by means of a spring-pawl $b^2$, carried upon a plate $b^3$ in the case A and secured to the upper end of the said shaft. This pawl is pivoted to the plate $b^3$ at $b^4$. Its end $b^5$ engages when it is moved in one direction with the ratchet-wheel $b^6$, mounted upon the stud $b^7$. A spring $b^8$, carried by the plate $b^3$, bears against the end $b^5$ and holds the end $b^9$ of the pawl in engagement with the pin $b^{10}$. This pin is so placed that it maintains the forward end of the pawl in contact with a tooth of the wheel $b^6$ when moving in one direction, and thereby causes the wheel to be turned a portion of a revolution. Upon the backward or reverse movement of the plate $b^3$ and of the pawl the spring $b^8$ yields sufficiently to permit the pawl to clear the teeth of the wheel $b^6$. The wheel $b^6$ has a pin projecting downward from its under surface and which at every full revolution of the wheel comes into contact with a tooth of the wheel $d'$. This wheel is mounted upon a stud $d^2$ and has a long sleeve $d^3$ extending above the dial D and carrying the indicator-hand $d^4$. This wheel communicates movement to the wheel E upon the stud $e$ by means of a pin $e^2$, projecting upward from the wheel $d'$. This wheel E has a sleeve $e^3$, which projects upward above the dial and carries the indicator $e^4$. The wheel E is in turn connected with the wheel F by means of the pin $e^5$, the said pin engaging a notch of the wheel F every rotation of the wheel E. The wheel F is mounted upon the stud $f$ and has a sleeve $f'$ extending above the dial and carrying the indicator $f^2$. The wheel F is connected with the last wheel G of the train by means of the pin $f^3$, which engages a tooth of the wheel G every revolution of the wheel F. The wheel G is mounted upon the stud $g$ and has a sleeve $g'$ extending above the dial and carrying an indicator $g^2$.

There may be detent-pawls for various of the wheels, and I have represented the wheels $b^6$ and E as provided with the detent-pawls $h$ and $h'$, formed from or upon a single strip $h^2$ of thin metal held by the stud $h^3$ at the center of its length. The strip is represented as bowed or curved upon each side of the pivot and as having its engaging ends formed by bending the ends very nearly to a right angle. Similar detents $h^3$ and $h^4$ are provided for the wheels F and G by a similar bent strip of metal fastened to the case by the stud $h^5$. While I have referred to the studs as being carried by the case, I would say that they may be mounted upon a separate plate adapted to be set in the case and to be removable from it.

With the organization shown in the drawings the wheels $d'$ E F G are adapted to be turned as follows: the wheel $d'$ and its indicator to make one full revolution for every mile run; the wheel E and its indicator, one full revolution for every ten miles run; the wheel F, one full revolution for every hundred miles run, and the wheel G one full revolution for every thousand miles run. The dial D is correspondingly marked—that is, the indications for the indicator $d^4$ show quarters of miles or any other subdivisions of a mile desired. The indications for the other indicator-hands represent in their respective order mile-divisions, ten-mile divisions, and one-hundred-mile divisions.

With the train connected as above described the indicator-hands of two wheels will rotate in a direction opposite that of the indicator-hands of the other two wheels. They may be made to turn in the same direction by interposing gears between the various wheels.

The tappet or projection $a$ is shown as comprising a piece of metal, rubber, or other suitable material $a^3$, removably secured to the spoke $a'$ by a clamp $a^4$. This clamp has the opening $a^5$, by which it is placed upon a spoke, being of a width to receive a spoke, and the set-screw $a^6$, which locks the clamp and the tappet to the spoke. (See Figs. 2 and 3.) This also permits the tappet to be adjustable upon the spoke longitudinally.

In operation the rotation of the wheel causes the tappet or projection $a$ to strike the arm $b$ and turn it sufficiently to move the pawl $b^4$ and actuate the registering mechanism. After the tappet has cleared the arm $b$ it is automatically returned to its original position by means of a spring. This spring is represented as applied to the form of construction above specified by means of a flat spring $m$, fastened at its end $m'$ and bearing against the straight edge $m^2$ of the pawl-plate $b^3$. (See Fig. 3.)

By attaching the cyclometer to the frame of the bicycle or tricycle and by causing it to be actuated by a moving part of the machine several important advantages are obtained. First, it can be so located as to be easily read while the machine is in motion; second, a much cheaper and simpler construction of cyclometer can be used than where the cyclometer is attached to the wheel to rotate with it, as in the ordinary construction.

Having thus fully described my invention, I desire to secure by Letters Patent of the United States—

In a cyclometer, the combination, with the case A, adapted to be attached to the fork of a bicycle or tricycle, of the shaft $b'$, provided with the arm $b$ and with the oscillating plate $b^3$, having a flattened side, the spring $m$, bearing against said flattened side, the spring-pressed pawl $b^2$, carried by said plate, the ratchet-wheel engaged by said pawl, a registering-train operated by said ratchet-wheel, and the adjustable and removable tappet $a$, clamped to a spoke of the machine-wheel and arranged to engage the said arm $b$ to operate the cyclometer positively, substantially as set forth.

FRANK C. WESTON.

Witnesses:
F. F. RAYMOND, 2d,
W. H. WHITNEY.